(12) United States Patent
Kopetz

(10) Patent No.: US 9,606,538 B2
(45) Date of Patent: Mar. 28, 2017

(54) DEVICE AND METHOD FOR THE AUTONOMOUS CONTROL OF MOTOR VEHICLES

(71) Applicant: FTS COMPUTERTECHNIK GMBH, Vienna (AT)

(72) Inventor: Hermann Kopetz, Baden (AT)

(73) Assignee: FTS COMPUTERTECHNIK GMBH, Vienna (AT)

( * ) Notice: Subject to any disclaimer, the term of this patent is extended or adjusted under 35 U.S.C. 154(b) by 0 days.

(21) Appl. No.: 14/775,993

(22) PCT Filed: Mar. 13, 2014

(86) PCT No.: PCT/AT2014/050062
§ 371 (c)(1),
(2) Date: Sep. 14, 2015

(87) PCT Pub. No.: WO2014/138765
PCT Pub. Date: Sep. 18, 2014

(65) Prior Publication Data
US 2016/0033965 A1 Feb. 4, 2016

(30) Foreign Application Priority Data

Mar. 14, 2013 (AT) .................. A 199/2013

(51) Int. Cl.
*G05D 1/00* (2006.01)
*G05D 1/02* (2006.01)
(Continued)

(52) U.S. Cl.
CPC .......... *G05D 1/0088* (2013.01); *B60W 10/18* (2013.01); *B60W 10/20* (2013.01); *B60W 30/09* (2013.01);
(Continued)

(58) Field of Classification Search
CPC .. B60W 10/18; B60W 10/20; B60W 2720/10; B60W 2750/308; B60W 30/09;
(Continued)

(56) References Cited

U.S. PATENT DOCUMENTS 7,124,027 B1 * 10/2006 Ernst, Jr. ............... B60W 30/09
340/435
7,675,919 B2 * 3/2010 Vestal ................. H04L 12/5693
370/395.4

(Continued)

FOREIGN PATENT DOCUMENTS

AT 1982013 3/2013
AT 2012013 3/2013
(Continued)

OTHER PUBLICATIONS

Euro NCAP Rating Review—Report from the Ratings Group dated Jun. 2012—online at http://www.euroncap.com/.
(Continued)

*Primary Examiner* — Tyler J Lee
(74) *Attorney, Agent, or Firm* — Sutherland Asbill & Brennan LLP

(57) ABSTRACT

The invention relates to a device for controlling the braking and/or steering and/or acceleration in a motor vehicle, wherein the device has a number of different sensor components, two diverse sensor fusion components, a man/machine interface component and a preferably intelligent actuator controller component, wherein each of these components constitutes a fault-containment unit and has a TTEthernet communications interface, and wherein all components are connected to a central TTEthernet message distribution unit, and wherein the components communicate with one another exclusively with use of standardized Ethernet messages, and wherein a diagnosis unit for time-
(Continued)

correct monitoring of the exchanged messages can be connected to the TTEthernet message distribution unit.

12 Claims, 2 Drawing Sheets

(51) Int. Cl.
    *B60W 30/09*     (2012.01)
    *B60W 10/18*     (2012.01)
    *B60W 10/20*     (2006.01)
    *H04L 12/403*     (2006.01)
    *B60W 30/14*     (2006.01)
    *H04L 12/40*     (2006.01)
    *H04L 12/44*     (2006.01)

(52) U.S. Cl.
    CPC ......... B60W 30/143 (2013.01); G05D 1/0055 (2013.01); G05D 1/021 (2013.01); H04L 12/403 (2013.01); H04L 12/40182 (2013.01); *B60W 2720/10* (2013.01); *B60W 2750/308* (2013.01); *H04L 2012/40273* (2013.01); *H04L 2012/445* (2013.01)

(58) Field of Classification Search
    CPC . B60W 30/143; G05D 1/0055; G05D 1/0088; G05D 1/021; H04L 12/40182; H04L 12/403; H04L 2012/40273; H04L 2012/445
    USPC .................................................. 701/1, 23, 70
    See application file for complete search history.

(56) References Cited

U.S. PATENT DOCUMENTS

| | | | | |
|---|---|---|---|---|
| 8,130,773 | B2* | 3/2012 | Hall | ........................ H04L 12/42 370/216 |
| 2002/0151297 | A1* | 10/2002 | Remboski | ........... B60R 16/0231 455/414.1 |
| 2009/0323704 | A1* | 12/2009 | Hall | ........................ H04L 12/42 370/401 |
| 2012/0166878 | A1* | 6/2012 | Sinha | .................... G06F 11/079 714/37 |
| 2013/0179528 | A1* | 7/2013 | Gianisis | ................ G06F 15/167 709/213 |
| 2015/0046603 | A1* | 2/2015 | Poledna | .................. G06F 9/542 709/248 |

FOREIGN PATENT DOCUMENTS

| | | |
|---|---|---|
| EP | 2073448 A1 | 6/2009 |
| EP | 2209241 A2 | 7/2010 |
| WO | 2008151339 A2 | 12/2008 |

OTHER PUBLICATIONS

Alena R.L., "Communications for Integrated Modular Avionics," Aerospace Conference, 2007 IEEEAC, Piscataway, NJ, USA.
Kopetz, H., "Real-Time Systems Design Principles for Distributed Embedded Applications," Spring Publication Company 2011.
Strayer, D.L., et al., "Profiles in Driver Distraction: Effects of Cell Phone Conversations on Younger and Older Drivers", Human Factors, vol. 46, pp. 640-649 2004.
Özgüner, Ü, et al., "Systems for Safety and Autonomous Behavior in Cars: The DARPA Grand Challenge Experience", Proc of IEEE, vol. 95, No. 2, pp. 397-412, 2007.
First Office Action dated Feb. 28, 2014 for Austrian Patent Application No. 199/2013.
International Search Report for PCT/AT2014/050062 dated Jun. 23, 2014.

* cited by examiner

DEVICE AND METHOD FOR THE AUTONOMOUS CONTROL OF MOTOR VEHICLES

TECHNICAL FIELD

The invention relates to a device for controlling the braking and/or steering and/or acceleration in a motor vehicle.

The invention also relates to a method for controlling the braking and/or steering and/or acceleration in a motor vehicle comprising such a device.

Lastly, the invention also relates to a motor vehicle comprising at least one such device.

BACKGROUND

The present invention lies in the field of automotive electronics. In the year 2012 the NCAP (European New Car Assessment Program) Organisation published a roadmap [4], from which it is clear that from the year 2016 Autonomous Emergency Braking (AEB) systems are to be introduced into new motor vehicles on a broad level. It is expected in the future that electronic systems for autonomous driving will be used on the market firstly for premium vehicles and later on the mass market.

From a technical/commercial viewpoint it is a great challenge to design these electronic systems, of which the functionality in prototypes has already been demonstrated [5], such that the required functionality and reliability can be achieved at reasonable cost. Besides the one-off development costs, the recurring production costs of the computer hardware and the maintenance costs are of particular significance in the mass market.

The electronic system for autonomous control of vehicles typically consists of the following components:

1. A number of diverse sensor components (camera, radar, laser, ultrasound, etc.) for monitoring the path of travel and the surroundings of the vehicle.
2. A sensor fusion component, which is usually realised redundant and which processes sensor data, creates within the computer a three-dimensional model of the surroundings, and determines the control values for the actuators.
3. A man/machine interface component, which accepts the control values from the driver and forwards these to an intelligent actuator controller component (AST).
4. A monitor component, which monitors the driver in order to determine the attentiveness of the driver.
5. An intelligent actuator controller component (AST), which receives the control values from the sensor component and the man/machine interface component and decides who has control of the vehicle and which control values are to be forwarded to the physical actuators (brakes, steering, engine) in the vehicle.

In accordance with the prior art these components are connected ad hoc via dedicated data and signal lines or with use of relatively slow bus systems (for example CAN bus or FlexRay).

SUMMARY

An object of the invention is to significantly improve a device of this type and a system of this type, in particular a fault-tolerant device of this type and a fault-tolerant system of this type for controlling the braking and/or the steering and/or the acceleration of a vehicle.

This object is achieved with a device of the type mentioned in the introduction in that, in accordance with the invention, the device comprises a number of different sensor components, two diverse sensor fusion components, a man/machine interface component and a preferably intelligent actuator controller component, wherein each of these components constitutes a fault-containment unit and has a TTEthernet communications interface, and wherein all components are connected to a central TTEthernet message distribution unit, and wherein the components communicate with one another exclusively with use of standardised Ethernet messages, and wherein a diagnosis unit for time-correct monitoring of the exchanged messages can be connected to a TTEthernet message distribution unit.

An existing device can be considerably improved by the introduction of a central TTEthernet message distribution unit.

In addition, each of the components is configured as an autonomous fault-containment unit (FCU) and is equipped with a TTEthernet message interface, such that the communication between the components can take place via the standardised high-performance real-time TTEthernet communication system [1] with a data rate of 1 Gb/sec.

Preferred embodiments of the device according to the invention and of the method according to the invention, which can be provided alone or in any combination with one another, are described hereinafter:

- all components are arranged on a circuit board, and the data lines between the components and the central message distribution unit are formed as conductive tracks on the circuit board;
- all components, with the exception of the sensor components, are arranged on a circuit board, and the data lines between the components, in particular the components on the circuit board and the central message distribution unit, are formed as conductive tracks;
- the central message distribution unit and all data lines to the central message distribution unit are designed redundantly;
- the man/machine interface component and the intelligent actuator controller component and also the data line between the actuator controller component and the actuators are designed redundantly;
- the device has two independent power sources, wherein in each case a first of two redundant components is supplied by the first power source and in each case the second component of the two redundant components is supplied by the second power source;
- it is of particular advantage when the two redundant sensor fusion components are formed in a diverse manner. The likelihood of simultaneous activation of design faults can thus be reduced. The redundant sensor fusion components perform the same tasks, wherein the software of the two redundant components is different. The hardware may be different, but does not have to be different.
- the sensor components, two sensor fusion components, the monitor component, the man/machine interface component, and the preferably intelligent actuator controller component communicate exclusively by means of standardised TTEthernet messages via a message distribution unit, wherein the message distribution unit is designed to copy a subset of these TTEthernet messages and to send them to a diagnosis unit, and wherein the diagnosis unit is designed to analyse and to store please copied messages.

In the method according to the invention for controlling the braking and/or steering and/or acceleration in a motor vehicle comprising a device of the above-described type, it is in particular advantageous when a number of sensor components, two sensor fusion components, a monitor component, a man/machine interface component, and an intelligent actuator controller component communicate exclusively by means of standardised TTEthernet messages via a message distribution unit, wherein the message distribution unit copies a subset of these TTEthernet messages and sends them to a diagnosis unit, and wherein the diagnosis unit analyses and stores these copied messages.

In addition, it may be advantageous in the method when the diagnosis unit produces messages that simulate the behaviour of each sensor component, of each of the two sensor fusion components, of the monitor component and of the man/machine interface component in the value and time domain.

The modular arrangement of the electronic components around the central TTEthernet real-time communication system brings the following advantages:

- The number of physical data lines is reduced, which leads to an improvement of the hardware reliability.
- Each of the two redundant sensor fusion components has access to the data of all sensors.
- The central message distribution unit may copy selected messages and send these to an independent diagnosis unit, which analyses and stores these messages. The time-correct monitoring of the results of any selected FCUs is thus made possible, which simplifies the testing, fault finding and maintenance.
- The diagnosis unit may simulate the behaviour of any FCU in real time.
- The connection of further sensors is significantly facilitated, which leads to a significant increase of the versatility of the electronics architecture.
- The precise time pattern of the TTEthernet communication system supports the system-wide analysis of the causality of sequences of events.
- The introduction of selective redundancy is simplified.

BRIEF DESCRIPTION OF THE DRAWINGS

The invention will be explained in greater detail hereinafter with reference to the drawing, in which.

The following specific example shows one of the many possible embodiments of the structure of a device according to the invention.

DETAILED DESCRIPTION

Figure 1:
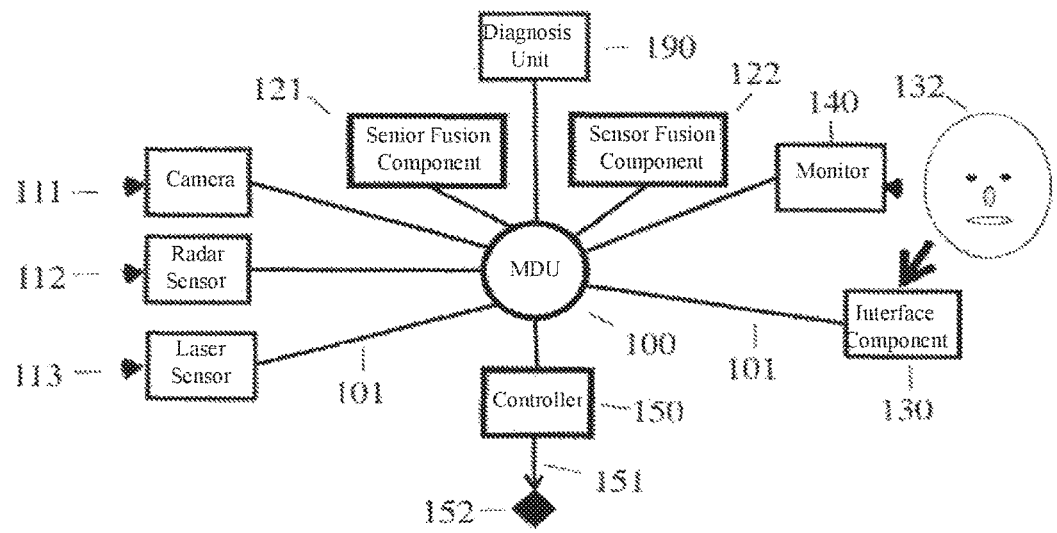
FIG. 1 shows an overview of the architecture of an exemplary device.

FIG. 1 shows, in the middle of the image, a central TTEthernet message distribution unit 100, around which the necessary components of a control system are arranged. Each of the components has a TTEthernet communications interface [1]. Exclusively Ethernet messages are transported over the data lines 101 between the components and the message distribution unit 100.

In accordance with the invention each component must form a fault-containment unit (FCU). An FCU is understood to mean an encapsulated sensor/hardware/software subsystem, wherein the immediate effects of a fault of this subsystem (irrespective of whether the fault is a hardware or software or sensor fault) are limited to this subsystem [6, page 136].

Therefore, in the proposed architecture a fault can only propagate from one component to another component indirectly via a faulty message. The message distribution unit 100 may be parameterised such that it copies a defined message class of the messages exchanged thereby and sends this, preferably in a time-correct manner, to a diagnosis unit 190. The time-correctness of the messages is of particular advantage, since it constitutes a precondition for a causal analysis of sequences of events. It is thus possible to send the results of each FCU also to the diagnosis unit for checking, such that the diagnosis unit 190 can identify a faulty component on the basis of the faulty messages produced thereby.

It is also possible that the diagnosis unit 190 simulates the behaviour of any other component by the generation of the corresponding message sequences of this component, i.e. the diagnosis unit 190 may simulate the behaviour of any sensor component, any of the two sensor fusion components, the monitor component and the man/machine interface component in the value and time domain.

On the left side of FIG. 1 three imaging sensors/sensor components 111, 112, 113 (for example a camera 111, a radar sensor 112 and a laser sensor 113) are shown by way of example. The image recognition takes place usually in two steps. In a first step significant features (lines, shadows, angles) are determined, and in a second step these features are combined in order to be able to identify objects. In order to reduce the amount of data at the message interface 101, it is proposed to carry out the first step of the image recognition—the recognition of significant features—in the corresponding sensor component and to send these features by means of TTEthernet messages to the diversely redundant sensor fusion components 121 and 122. The sensor fusion components 121 and 122 are designed to be diverse in order to reduce the likelihood of the simultaneous activation of design faults.

The sensor fusion component 121 receives the data delivered by all sensor components via the message distribution unit 100 in order to construct an internal three-dimensional model of the surroundings of the vehicle. All objects that have been detected by the sensors are represented spatially and classified (for example as to whether the object is an obstacle or a shadow) in this model. If an obstacle has been identified in the intended path of travel, corresponding control values (for example braking or steering) are thus output to an actuator controller (AST) 150. The sensor fusion component 121 may also determine a criticality index KI of the current scenario [2].

The sensor fusion component 122 operates parallel to the sensor fusion component 121, but with different software. In [3] a method is disclosed for fusing the two control values determined by the sensor fusion component 121 and the sensor fusion component 122 in the event that a software fault has occurred The monitor component 140 monitors the driver 132 and determines an engagement index EI of the driver, as disclosed in [2].

A man/machine interface component 130 accepts the request of the driver and cyclically sends TTEthernet messages with the control values of the driver to the (preferably intelligent) AST 150. The AST 150 may decide, on the basis of a criticality index KI from the sensor fusion component 121 and the engagement index EI from the monitor component 140, which control values are output via the data line 151 to the actuators 152 in the vehicle (brakes, steering, engine) (see [2]).

Figure 2:
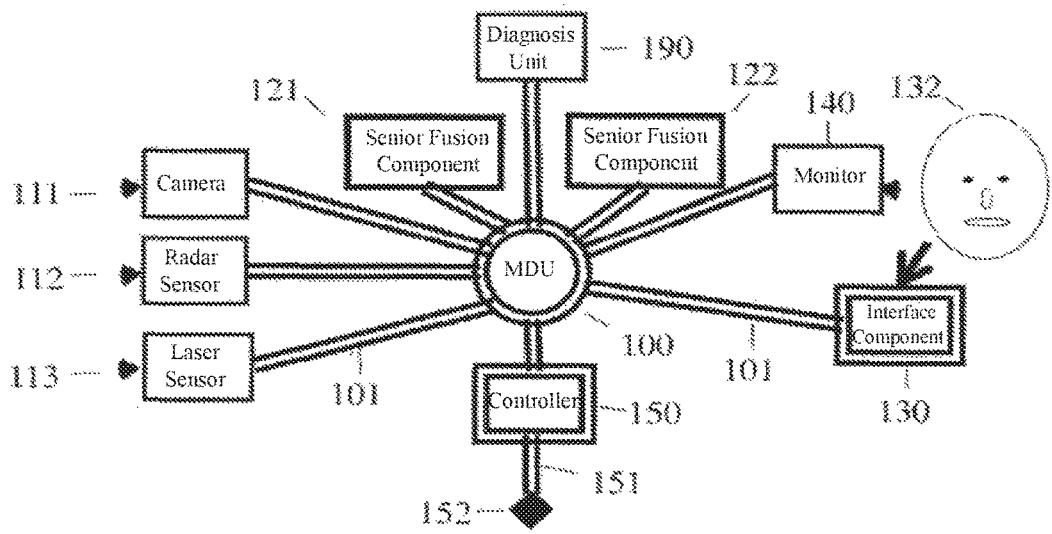
FIG. 2 shows how the reliability can be improved by the introduction of specific redundancy.

FIG. 2 shows the electronics architecture of FIG. 1, wherein selected components and data lines are formed redundantly. The objective of FIG. 2 is to tolerate any critical individual faults that could lead to a failure of the system as a whole. In order to achieve this objective, the central message distribution unit 100 and all data lines 101, which lead to the message distribution unit, must be formed redundantly. In addition, the man/machine interface component 130 and the AST 150 and also the data line 151 from the AST to the physical actuators must be formed redundantly. The sensor components 111, 112 and 113 do not have to be formed redundantly, since all of these senses deliver highly redundant data concerning the surroundings of the vehicle, and therefore the failure of one sensor can be tolerated. The sensor fusion components 121 and 122 are already redundant. A failure of the monitor component can be compensated for in part by the AST 150 in that the AST 150 derives the engagement index EI of the driver from the control values predefined by the driver [2].

In order to be able to tolerate the consequences of a fault in the power supply, the redundant electronic systems must be supplied by two independent power sources, wherein the first instance of each redundant component is supplied by the first power source and where the second instance of each redundant component is supplied by the second power source.

The present invention lies in the field of automotive electronics. It describes a network-based architecture of a fault-tolerant control system for the autonomous control of the brakes and/or the steering and/or the acceleration of the vehicle. It is proposed to form all sensor and processing components as autonomous fault-containment units (FCUs) and to equip these with a TTEthernet message interface, such that the entire communication between the components can take place via a message distribution unit of the standardised high-performance real-time TTEthernet communication system. This network-based architecture increases the reliability, the maintainability and the versatility and facilitates the commissioning of the electronics.

Figure 3:
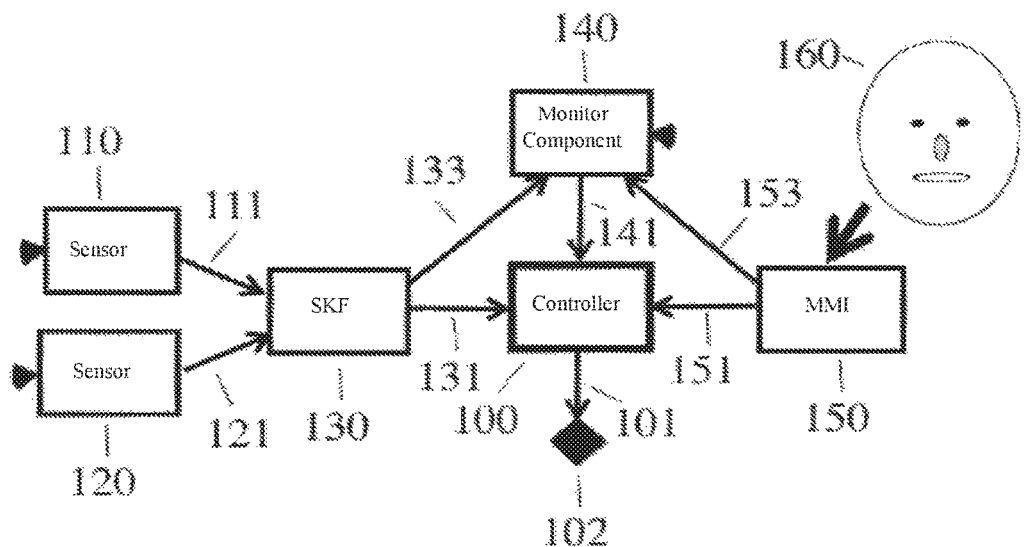
FIG. 3 shows the structure of a control system, on the basis of which the determination of the criticality index KI and of the engagement index EI is explained.

Hereinafter, a preferred determination of the criticality index KI and of the engagement index EI as described in [2] will also be explained. It is noted that the reference signs used hereinafter with reference to FIG. 3 are identical in part to those from FIGS. 1 and 2, however they do not necessarily designate the same elements as those in FIGS. 1 and 2. The reference signs in FIG. 3 are thus to be understood merely in conjunction with FIG. 3:

In many technical fields of application, legislation stipulates that a human must monitor a process performed autonomously and must be capable at any moment in time of intervening in the process. In such an automated technical installation there are two independent control systems: on the one hand the autonomous technical control system with its sensors and on the other hand the human. By means of the parallel control of the control systems, unintentional negative emergent properties may be produced. The present invention discloses a method for allocating the control in order to prevent these negative emergent properties. The method will be explained more precisely on the basis of the example of the control of an autonomous vehicle.

In accordance with FIG. 3 the proposed control system for an autonomous technical installation consists of four blocks. On the left side of FIG. 3 the controlling computer system CS is illustrated. It contains sensors 110 and 120 and a sensor fusion component SFK 130. A preferably intelligent actuator controller AST 100 is shown in the middle. The AST 100 specifies the control values to actuators 102 of a technical installation via a data line 101. On the right side of FIG. 3 the human operator HO 160 with a man/machine interface component MMI 150 is illustrated, and a monitor component MK 140 can be seen in the figure above the AST 100.

Hereinafter, the function of this controller system will be explained on the basis of the example of the controller of an autonomous vehicle. The sensors 110 and 120, for example a camera and a laser sensor, cyclically monitor the surroundings of the vehicle and send the captured data via data lines 111 and 121 to the SFK 130. The duration of a typical cycle is 10 msec by way of example. The SFK 130 creates a three-dimensional model of the surroundings of the vehicle on the basis of the cyclically captured ambient data, calculates the distance from obstacles in the path of travel, and, if the obstacles move, calculates the direction of movement and speed thereof. Following an analysis of a three-dimensional model, the control values for the AST 100 are determined by the SFK 130 under consideration of the speed of the vehicle itself, and these control values are transferred cyclically to the AST 100 via a data line 131.

Within the scope of the analysis of the model the SFK 130 determines critical locations in the three-dimensional space which are of particular significance to the future movement of the vehicle. If, for example, a pedestrian moves in the direction of the carriageway without reducing its speed, the anticipated location where the pedestrian will step onto the carriageway is thus a critical location. A critical location is designated a Point-of-Critical Action (PCA). The SFK determines in the three-dimensional model a sight vector between the eyes of the driver and the PCA and sends the parameters of this sight vector to the MK 140 via a data line 133.

When the identified PCA lies in the intended path of travel of the vehicle, the SFK 130 will thus initiate an action (for example braking process) in order to stop the vehicle before reaching the pedestrian. The latest moment at which an action (for example emergency braking) can be introduced in order to still stop before the obstacle is reached is referred to as the Last Instant of Action (LIA).

Table 1 given below lists the braking distance and the braking time of a passenger car under normal road conditions. The onset time is to be understood to mean the time that passes between the appearance of an obstacle and the onset of braking. The following actions must take place during the onset time:
monitoring of the scenario
analysis of the scenario
determination of the necessary action
onset of the action.

From the literature [8] a typical value for the onset time of the HO 160 is one second, whereas for the CS a value of 100 msec is assumed. The onset distance in Tab. 1 specifies the length of the path covered by the vehicle during the onset time. The braking path BW is the sum of the onset distance and the distance necessary to stop the vehicle following the onset of braking. In the table: AE=onset distance; BW=braking distance; auto=automatically. The following assumptions are made: onset time=manually 1 sec, automatically=0.1 sec.

TABLE 1

Braking distance and braking time [9]

| Speed km/h | AE in m manually | AE in m auto | BW in m manually | BW in m auto | Braking time in s auto |
|---|---|---|---|---|---|
| 30 | 8.3 | .83 | 12.1 | 4.7 | 1.0 |
| 50 | 14 | 1.4 | 24.6 | 12 | 1.6 |
| 80 | 22.2 | 2.2 | 49.6 | 29.6 | 2.6 |
| 100 | 27.8 | 2.8 | 70.7 | 45.6 | 3.2 |
| 130 | 36.1 | 3.6 | 108.6 | 76 | 4.1 |
| 160 | 44.4 | 4.4 | 154 | 114 | 5 |

The remaining response time VRZ is the time between the current, effective time/moment in time (now) and the LIA. The VRZ is a measure for the criticality of the current scenario. The SFK determines from the VRZ, under consideration of the speed of the vehicle and the current driving conditions, a criticality index KI of the current scenario. The standardised KI lies between 0 and 1, wherein 0 represents the lowest criticality and 1 represents the highest criticality.

With reference to Tab. 1 the KI can be determined as follows, by way of example:
when VRZ>4*braking time, then KI=0,
when VRZ braking time, then KI=1, otherwise
KI=(1−(VRZ−braking time)/(3*braking time))

The KI is transferred cyclically from the SFK 130 via the data line 131 to the AST 100.

The HO 160 in FIG. 3 monitors with his eyes the surroundings of the vehicle, analyses the scenario and provides his control values to the MMI 150 by tactile means. In a motor vehicle the MMI consists fundamentally of the brakes, the steering wheel and the accelerator pedal. In [7] it is proposed by way of example to install a sensor in the steering wheel, which sensor measures the force with which the HO holds the steering wheel. The MMI receives these control values cyclically and forms a vector (current control vector CCV), which includes the control values received from the HO in the current and recently past cycles (for example the recently past cycles are the last 10 cycles). The CCV is transferred cyclically to the AST 100 and to the MK 140.

The MK 140 cyclically captures, by means of a camera, the line of sight of the eyes of the HO 160 (driver) in order to determine whether the HO 160 is monitoring the path of travel and the PCA received from the SFK 130, and determines an optical attentiveness index OAI in the current cycle. The OAI has the value 1 when the optical attentiveness of the HO 160 is evident in the current cycle. If the HO 160 is not looking at the path of travel or has nodded off momentarily, the OAI has the value 0, otherwise a value between 1 and 0. The MK 140 then stores the OAI in a vector in order to form a time series of the OAIs in the immediately past cycles, for example within a second (the onset time of Tab. 1), and calculates from this time series, preferably by means of exponential smoothing, a preferably smoothed, optical attentiveness index $OAI_{smooth}$, wherein the OAI values from the more recent past (for example the last past 10 cycles) are weighted more heavily than the older values.

The MK 140 calculates a preferably smoothed motor attentiveness index $MAI_{smooth}$ in a similar manner in each cycle from the CCV received from the MMI 150, preferably by means of exponential smoothing.

The engagement index EI specifies the extent to which the HO is involved at the current moment in time with the control of the vehicle. EI is a function of $OAI_{smooth}$ and $MAI_{smooth}$. This function will be different in the different traffic situations (town traffic, driving on a motorway). A possible expression of this function is illustrated in Tab. 2.

TABLE 2

Engagement index EI as a function of $OAI_{smooth}$ and $MAI_{smooth}$

| | $MAI_{smooth}$ | | | | | |
|---|---|---|---|---|---|---|
| $OAI_{smooth}$ | 0.0 | 0.2 | 0.4 | 0.6 | 0.8 | 1.0 |
| 0.0 | 0.0 | 0.1 | 0.2 | 0.2 | 0.3 | 0.3 |
| 0.2 | 0.0 | 0.1 | 0.2 | 0.3 | 0.4 | 0.4 |
| 0.4 | 0.0 | 0.2 | 0.3 | 0.4 | 0.5 | 0.5 |
| 0.6 | 0.0 | 0.2 | 0.3 | 0.5 | 0.6 | 0.7 |
| 0.8 | 0.0 | 0.2 | 0.4 | 0.5 | 0.7 | 0.9 |
| 1.0 | 0.0 | 0.2 | 0.4 | 0.6 | 0.8 | 1.0 |

The EI is a standardised variable with values between 0 and 1, wherein 0 means that the HO 160 is not engaged and 1 means that the HO 160 is fully engaged. The second column in Tab. 2 ($MAI_{smooth}$=0.0) deals with the case in which the HO 160 is following events attentively to a greater or lesser extent, but is not intervening in the event. The MK 140 transmits the EI cyclically via the data line 141 to the AST 100.

The AST 100 receives, in each cycle, a set of control values for the actuators and the KI of the current scenario from the SFK 130, a further set of control values for the actuators from the MMI 150, and the current EI of the HO 160 from the MK 140.

Firstly, the AST must decide who is exerting the control on the actuators in the current cycle: the SFK 130 or the HO 160 (via the MMI 150). If EI>KI, the HO 160 is assuming the control and the AST is receiving the control values from the MMI 150. If EI>$EI_{limit}$ and the HO 160 has exerted control in the past cycle, then the HO 160 also assumes the control in the current cycle. $EI_{limit}$ is a parameter that is introduced in order to prevent an oscillation of the control between the HO 160 and the SFK 130 when an episode with high engagement of the HO 160 occurs. When EI≤$EI_{limit}$ and KI≥EI, then the SFK 130 assumes the control. The AST 100 then subsequently transfers the selected control values to the actuators 102.

An exemplary value for $EI_{limit}$ is 0.7.

By means of a clear allocation of the control, the occurrence of random negative emergent properties can be prevented in an SoS, and the safety of the system can be increased. The present invention is therefore of great economical and social importance.

The described method for allocating control in an SoS can be applied not only to autonomous vehicles, but also to a multiplicity of other autonomous devices, for example the control of robots.

Figure 4:
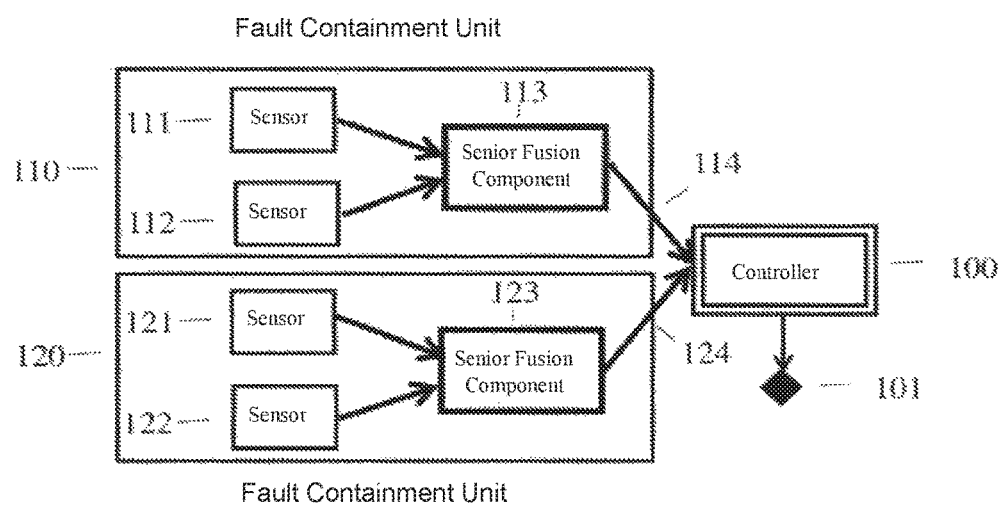
FIG. 4 shows the structure of a redundant control system.

In [3] a method is disclosed for fusing the control values determined by two sensor fusion components in the event that a software fault occurs. This method described in [3] will be explained here hereinafter with reference to FIG. 4. It is noted that the reference signs used hereinafter with reference to FIG. 4 are identical in part with those from FIGS. 1 to 3, but do not necessarily denote the same elements as those in FIGS. 1 to 3. The reference signs in FIG. 4 are thus to be understood merely in conjunction with FIG. 4:

The following specific example describes this method with reference to an autonomous braking system in a vehicle.

In June 2012 the NCAP (European New Car Assessment Program) Organisation published a roadmap [4], from which it is clear that from the year 2016 Autonomous Emergency Braking (AEB) systems are to be introduced into new motor vehicles on a broad level. In order to improve the reliability and safety of autonomous braking systems, the sensors monitoring the surroundings of the vehicle and the electronics necessary for the evaluation are to be distributed between two self-sufficient fault-containment units (FCUs) [2] and are to fuse the control values determined by the two independent FCUs in such a way that the vehicle, even in the event of the occurrence of a fault in an FCU, can be brought quickly into a safe state. An FCU is to be understood to mean an encapsulated sensor/hardware/software subsystem, wherein the immediate effects of a fault of this subsystem (irrespective of whether this is a hardware or software or sensor fault) are limited to this subsystem [6, page 136]. An FCU is self-sufficient when this FCU is able to provide the requested functionality without reference to a further FCU.

In accordance with the invention an AEB system consists of the two FCUs 110 and 120. The FCU 110 has sensors (for example camera, radar) 111 and 112 for monitoring the surrounding environment of the vehicle. The FCU 120 has sensors 121 and 122. The sensors 111, 112, 121 and 122 are read out cyclically, wherein the duration of a cycle is typically 10 msec. In the FCU 110 the sensor fusion component 113 receives the sensor data and calculates a control value for the brake actuators, wherein the control value 0 means do not brake and the control value 1 means activate the maximum braking force. The sensor fusion component 123 calculates the control value of the FCU 120 analogously. The two control values are output via the data lines 114 and 124 to the intelligent actuator controller (AST) 100 in order to control the braking. The AST 100 can be executed on a self-checking hardware in order to immediately be able to identify a hardware fault of the AST 100. It is assumed that the relatively simple software of the AST 100 is free from design faults.

In the fault-free case the two control values of the FCUs 110 and 120 are identical and it is therefore irrelevant which of the two control values is received by the AST 100.

In the event of a fault, the two control values of the FCUs 110 and 120 are different. In an extreme case the FCU 110 in a cycle determines the value 1 (full braking) and the FCU 120 determines the value 0 (do not brake). Since it is assumed that only one FCU is erroneous, one of these two values is correct and the other is incorrect. It is not known which value is correct and which value is incorrect. If the correct value is 0 (do not brake), the selection of the incorrect value 1—unnecessary spontaneous full braking—may then lead to a rear-impact collision by the following vehicle. If, by contrast, the correct value is 1 (full braking), the selection of the incorrect value 0 will then likely lead to a collision. In order to limit the risk of an incorrect choice, it is proposed in the event of a fault (unequal control values of the two FCUs) to calculate a control value by means of a weighted mean value algorithm, which for safety reasons weights the alternative brake more heavily than the alternative do not brake.

It is also proposed that in the event of a fault (unequal control values) the intelligent AST files a fault message in the diagnosis memory of the vehicle.

In accordance with the invention the AST 100 determines the control value B of the current cycle i from the two control values of the FCUs 110 and 120 by applying the following formula $$B_i = (g \cdot B_{large} + B_{small})/(g+1)$$

wherein $B_{large}$ is the greater of the two control values and $B_{small}$ is the smaller of the two control values of the FCUs 110 and 120. The variable g indicates the weight with which the greater control value (brake heavily) is to be taken into consideration compared with the smaller control value (brake less heavily).

In the following example g=3 is assumed, i.e. in the weighted mean value algorithm the greater control value has a weight three times greater than that of the smaller control value. Due to the heavier weighting of the greater control value, the vehicle is guided, in the event of a fault, quickly into a safe state (for example into a braking or braked state or standstill).

TABLE 1

Control value as a function of $B_{large}$ and $B_{small}$; g = 3

| $B_{large}$ | $B_{small}$ | | | | | |
|---|---|---|---|---|---|---|
| | 1.0 | 0.8 | 0.6 | 0.4 | 0.2 | 0.0 |
| 1.0 | 1 | 0.95 | 0.9 | 0.85 | 0.80 | 0.75 |
| 0.8 | — | 0.8 | 0.75 | 0.70 | 0.65 | 0.60 |
| 0.6 | — | — | 0.6 | 0.55 | 0.50 | 0.45 |
| 0.4 | — | — | — | 0.4 | 0.35 | 0.3 |
| 0.2 | — | — | — | — | 0.2 | 0.15 |
| 0.0 | — | — | — | — | — | 0.0 |

The example with the weighting g=3 shows that, in the considered extreme case, i.e. one FCU requests full braking, but the other do not brake, a braking force of 75% is applied. It is also clear from Table 1 that in a fault-free scenario (diagonal in Tab. 1), there is no modification of the control value.

In contrast to systems based on analogue technology, in digital systems the effects of a fault on the result are unpredictable. In order to further cushion an extreme spontaneous reaction of the PS (in the above example the motor vehicle) caused by a fault, in the event of the sudden occurrence of a large difference between the calculated control values of the two FCUs, the control value Bi in the cycle i may be further corrected by means of the formation of a weighted mean value from the current control value and the control value of the immediately previous cycle i–1. For this purpose it is proposed for the AST 100 to calculate a corrected control value B war as follows $$B_{icor} = (B_i + B_{i-1} \cdot (B_{large} - B_{small}))/(1 + B_{large} - B_{small})$$

If $(B_{large} - B_{small}) = 0$ (equal control values), then $B_{icor} = B_i$, i.e. there is no correction. If, by contrast, $(B_{large} - B_{small}) = 1$ (extreme case) then $B_{icor} = (B_i + B_{i-1})/2$, i.e. $B_{icor}$ assumes the mean value of the two last cycles. For all other values of $(B_{large} - B_{small})$ the value $B_{icor}$ lies between these two limits. This calculation of the corrected control value $B_{icor}$ leads to the cushioning of a spontaneous reaction caused by a fault.

The proposed method can be used in redundant systems at relatively low cost and leads to a significant increase of the reliability and safety of autonomous control systems.

CITED LITERATURE

[1] U.S. Pat. No. 7,839,868. Kopetz, H. Communication method and system for the transmission of time-driven and event-driven Ethernet messages. Granted Nov. 23, 2010.
[2] Austrian patent application A 201/2013 by FTS Computertechnik. Verfahren zur Allokation der Kontrolle in einem System-of-Systems (Method allocating control in a system-of-systems). Filed on 14 Mar. 2013.
[3] Austrian patent application A 198/2013 by FTS Computertechnik. Verfahren zur Risikobegrenzung von Fehlern in einem sicherheitsrelevanten Steuerungssystem (Method for limiting the risk of faults in a safety-relevant control system). Filed on 14 Mar. 2013.
[4] NCAP Rating Group. EURO NCAP Rating Review 2012. Online at: http://www.euroncap.com/
[5] Özgüner, Ü., et al. *System for Safety and Autonomous Behavior in Cars: The DARPA Grand Challenge Experience.* Proc. of the IEEE. Vol 95. No. 2. Pp. 397-412. 2007.
[6] Kopetz, H., *Real-time Systems-Design Principles for Distributed Embedded Applications.* Springer Publishing Company, 2011.
[7] US Patent Application 200432334. Kind, C. Doze-off early Warning System for Automotive and other Applications. US Patent Application 200432334. Feb. 19, 2004.
[8] Strayer, D. L. et al. *Profiles in Driver Distraction: Effects of Cell Phone Conversations on Younger and Older Drivers.* Human Factors. Vol. 46. No. 4, pp. 640-649. 2004
[9] Autokiste., *Brake distance calculator,* accessed on Jan. 13, 2013 at URL: http://www.autokiste.de/service/anhalteweg/index.htm

The invention claimed is:

1. A device for controlling at least one of braking, steering, or acceleration in a motor vehicle, the device comprising:
a plurality of different sensor components (111, 112, 113);
an interface component (130); and
an actuator controller component (150);
wherein each of these sensor, interface, and actuator controller components constitutes a fault-containment unit and has a TTEthernet communications interface;
wherein the device further comprises two separate and diverse sensor fusion components (121, 122) configured to operate in parallel to construct a model of surroundings using different software to determine a criticality index of a current scenario; and
a monitor component (140) for monitoring a driver of the motor vehicle and configured to determine an engagement index of the driver;
wherein each of the two diverse sensor fusion components (121, 122) likewise constitutes a fault-containment unit and has a TTEthernet communications interface;
wherein all components of the device are connected to a central TTEthernet message distribution unit (100), and wherein the components communicate with one another exclusively with use of standardised Ethernet messages; and
wherein the actuator controller component controls at least one of braking, steering, or acceleration in the motor vehicle based on the criticality index and the engagement index.

2. The device of claim 1, wherein all components (111, 112, 113, 130, 150, 121, 122, 100) are arranged on a circuit board with data lines (101) between the components and the central TTEthernet message distribution unit (100), wherein the data lines (101) are formed as conductive tracks on the printed circuit board.

3. The device of claim 1, wherein all components (130, 150, 121, 122, 100), with the exception of the sensor components, are arranged on a circuit board with data lines (101) between the components, wherein the data lines (101) between the components on the circuit board and the central message distribution unit (100) are formed as conductive tracks.

4. The device of claim 1, wherein the central message distribution unit (100) and all data lines to the central message distribution unit are designed redundantly.

5. The device of claim 1, wherein the interface component (130), the actuator controller component (150), and a data line (151) between the actuator controller component and the actuators are designed redundantly.

6. The device of claim 1, wherein the device has two independent power sources, wherein in each case a first of two redundant components is supplied by the first power source and in each case the second component of the two redundant components is supplied by the second power source.

7. The device of claim 1, wherein the two redundant sensor fusion components (121, 122) are formed in a diverse manner.

8. The device of claim 1, wherein the sensor components (111, 112, 113), the two diverse sensor fusion components (121, 122), the monitor component (140), the interface component (130), and the actuator controller component (150) communicate exclusively by means of standardised TTEthernet messages via a message distribution unit (100), wherein the message distribution unit (100) is designed to copy a subset of these TTEthernet messages and to send them to a diagnosis unit (190), and wherein the diagnosis unit (190) is designed to analyse and to store these copied messages.

9. The device of claim 1, wherein a diagnosis unit (190) for time-correct monitoring of the exchanged messages is connected to the TTEthernet message distribution unit (100).

10. A method for controlling at least one of braking, steering, or acceleration in a motor vehicle comprising using the device of claim 1, wherein the plurality of sensor components (111, 112, 113), the two diverse sensor fusion components (121, 122), the monitor component (140) for monitoring the driver of the motor vehicle, the interface component (130), and the actuator controller component communicate (150) exclusively by means of standardised TTEthernet messages via a message distribution unit (100).

11. The method of claim 10, wherein the message distribution unit (100) copies a subset of these TTEthernet messages and sends them to a diagnosis unit, and wherein the diagnosis unit analyses and stores these copied messages.

12. The method of claim 10, wherein the diagnosis unit produces messages that simulate the behaviour of each sensor component (111, 112, 113), of each of the two diverse sensor fusion components (121, 122), of the monitor component (140) and of the interface component (130) in the value and time domain.

* * * * *